United States Patent
Hohler et al.

(10) Patent No.: US 6,627,855 B2
(45) Date of Patent: Sep. 30, 2003

(54) MERCHANDISERS WITH CENTRAL HEATING AND CONTROL MECHANISMS AND METHODS FOR MANUFACTURING AND RECONFIGURING SUCH MERCHANDISERS

(75) Inventors: Melissa M. Hohler, Kettering, OH (US); Peter J. Koopman, Richmond, IN (US); Robert T. Wood, Tipp City, OH (US); Thomas M. Smith, Eaton, OH (US)

(73) Assignee: Henny Penny Corporation, Eaton, OH (US)

( * ) Notice: Subject to any disclaimer, the term of this patent is extended or adjusted under 35 U.S.C. 154(b) by 0 days.

(21) Appl. No.: 09/901,132

(22) Filed: Jul. 10, 2001

(65) Prior Publication Data

US 2003/0052116 A1 Mar. 20, 2003

Related U.S. Application Data

(63) Continuation of application No. 09/560,135, filed on Apr. 28, 2000, now Pat. No. 6,259,065.
(60) Provisional application No. 60/131,467, filed on Apr. 28, 1999, and provisional application No. 60/132,405, filed on Apr. 30, 1999.

(51) Int. Cl.[7] .............................. A21B 1/26; A47J 36/24; A47F 3/04
(52) U.S. Cl. ...................... 219/400; 219/385; 219/214; 219/400
(58) Field of Search ................................ 219/214, 400; 99/474, 476; 222/146.5; 126/21 A

(56) References Cited

U.S. PATENT DOCUMENTS

| | | | |
|---|---|---|---|
| 1,800,863 A | * | 4/1931 | Johnson ...................... 219/214 |
| 2,018,024 A | | 3/1932 | Kress |
| 2,229,911 A | * | 1/1941 | Anderson ................... 312/131 |
| 2,561,517 A | | 7/1951 | Ladge |
| 2,919,339 A | | 1/1956 | Hilliker |
| 2,831,098 A | | 3/1956 | Lüscher |

(List continued on next page.)

*Primary Examiner*—Joseph Pelham
(74) *Attorney, Agent, or Firm*—Baker Botts L.L.P.

(57) ABSTRACT

A merchandiser for displaying food products and holding such food products at a controlled temperature has a well divided into three or more well sections, wherein each of the well sections receives a serving tray and wherein the serving trays collectively have a center line. A rear access door, a pair of side plates, and a transparent front plate, together with the well, define a food product holding cavity. A pair of supporting brackets position a merchandiser heating and control device above the well. The merchandiser heating and control device has a heating compartment, which positions three or more heating elements and three or more illuminating elements substantially above the center line of the serving trays, wherein the heating compartment includes three or more circulating fans for circulating heated air from the heating compartment into the holding cavity. The merchandiser heating and control device also has a retaining bracket for receiving an upper edge of the rear access door and has an enclosed guide surface. Further, the merchandiser heating and control device has a control compartment positioned above the retaining bracket and containing control elements for controlling heating elements and illuminating elements and having a rear control panel, wherein the control compartment includes a cooling fan for cooling the control elements and a plurality of vents formed in the control panel for drawing cooling air into the control compartment from outside the holding cavity and for exhausting heated air outside the holding cavity. Moreover, the merchandiser heating and control device has a securing bracket for mounting an upper edge of the transparent front plate. Methods for manufacturing such merchandisers permit them to be readily reconfigured during manufacture or at a customer site.

4 Claims, 11 Drawing Sheets

U.S. PATENT DOCUMENTS

| | | | |
|---|---|---|---|
| 2,784,662 A | * 3/1957 | Grosz et al. | 219/400 |
| 2,860,225 A | 11/1958 | Steen | |
| 3,030,486 A | 4/1962 | Lashley | |
| 3,222,114 A | 12/1965 | Stentz | |
| 3,261,650 A | 7/1966 | Stromqvist | |
| 3,288,129 A | 11/1966 | Fox | |
| 3,311,434 A | 3/1967 | Dyer et al. | |
| 3,327,092 A | * 6/1967 | Wilson | 219/214 |
| 3,456,598 A | 7/1969 | MacKay | |
| 3,502,020 A | 3/1970 | Bresickello | |
| 3,632,968 A | 4/1972 | Wilson | |
| 3,752,549 A | 8/1973 | Binks et al. | |
| 3,886,346 A | 5/1975 | Meyers | |
| 3,924,100 A | 12/1975 | Mack et al. | |
| D238,471 S | 1/1976 | Roderick | |
| 3,982,584 A | 9/1976 | Spanoudis | |
| 3,999,475 A | 12/1976 | Roderick | |
| 4,019,022 A | 4/1977 | Seider et al. | |
| 4,030,476 A | 6/1977 | Hock | |
| 4,036,401 A | 7/1977 | Nachtigall, Jr. | |
| D245,958 S | 10/1977 | Roderick | |
| 4,052,589 A | 10/1977 | Wyatt | |
| 4,068,115 A | 1/1978 | Mack et al. | |
| 4,074,108 A | * 2/1978 | King | 219/214 |
| 4,126,775 A | 11/1978 | Wyatt | |
| 4,132,216 A | 1/1979 | Guibert | |
| 4,165,620 A | * 8/1979 | Kiesel et al. | 99/476 |
| 4,194,109 A | 3/1980 | Springer | |
| 4,225,204 A | 9/1980 | Bellavoine | |
| 4,233,495 A | 11/1980 | Scoville et al. | |
| 4,235,282 A | 11/1980 | de Filippis et al. | |
| 4,250,955 A | 2/1981 | Plattner et al. | |
| 4,285,391 A | 8/1981 | Bourner | |
| 4,323,110 A | 4/1982 | Rubbright et al. | |
| 4,343,985 A | * 8/1982 | Wilson et al. | 219/214 |
| 4,345,143 A | 8/1982 | Craig et al. | |
| 4,733,054 A | 3/1988 | Paul | |
| 4,757,184 A | 7/1988 | Swanson et al. | |
| 4,918,579 A | 4/1990 | Bennett | |
| 5,069,273 A | 12/1991 | O'Hearne | |
| 5,182,438 A | 1/1993 | Oakes et al. | |
| 5,285,051 A | 2/1994 | DeGrow et al. | |
| 5,375,511 A | 12/1994 | Huie et al. | |
| 5,396,046 A | 3/1995 | Oelfke | |
| 5,660,103 A | 8/1997 | Koopman | |
| 5,771,789 A | * 6/1998 | Davis | 126/21 A |
| 5,783,803 A | 7/1998 | Robards, Jr. | |
| 6,111,224 A | * 8/2000 | Witt | 219/214 |

\* cited by examiner

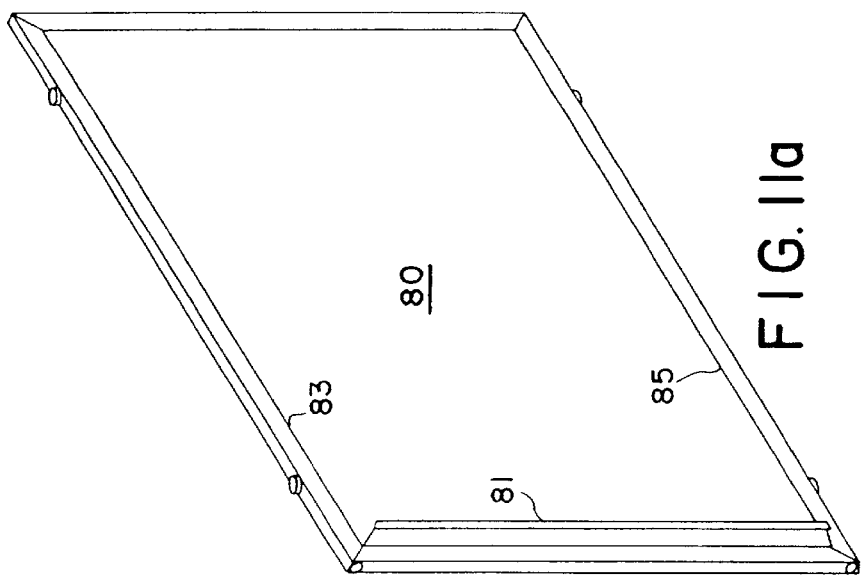
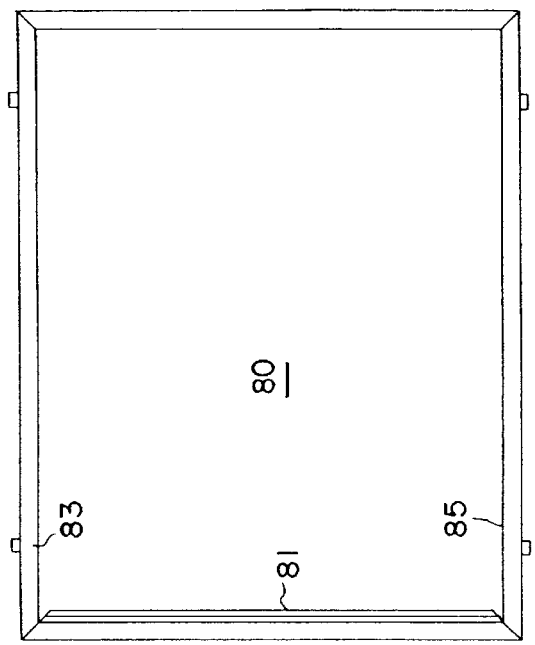

MERCHANDISERS WITH CENTRAL HEATING AND CONTROL MECHANISMS AND METHODS FOR MANUFACTURING AND RECONFIGURING SUCH MERCHANDISERS

This application is a continuation of U.S. patent application Ser. No. 09/560,135, filed Apr. 28, 2000, now issued as Patent No. U.S. Pat. No. 6,259,065 B1, which is incorporated herein by reference, and claims the benefit of U.S. Provisional Application No. 60/131,467, filed Apr. 28, 1999, and U.S. Provisional Application No. 60/132,405, filed Apr. 30, 1999.

BACKGROUND OF THE INVENTION

1. Field of the Invention

The invention relates generally to merchandisers with central heating and control mechanisms and methods for manufacturing such merchandisers. In particular, the invention relates to merchandisers, in which the heating mechanism is positioned to facilitate the reconfiguration of the merchandiser glass front profile and a control mechanism positioned adjacent to the heating mechanism above the merchandiser's rear access doors. Moreover, the invention relates to methods for and relating to reconfiguring merchandiser glass front profiles.

2. Description of Related Art

Known merchandisers have limited design flexibility. Aesthetic changes are difficult, costly, or impossible in the field and time consuming during production. In particular, known designs generally provide for the front support (nosepiece) to be attached in the first step of assembly. This makes reconfiguring the glass front profile of the merchandise difficult or impossible later in the field.

For example, if a merchandiser is designed as a curved profile unit, it is impossible to change the glass front profile further during the manufacturing process (if a customer order should request a profile change) without disassembling the merchandiser. The later in the manufacturing process, at which a design change is initiated, the more time-consuming the change becomes. Moreover, it is difficult or impossible to make such changes in the field. Thus, generally, if a customer wishes to change the profile of its merchandiser, the customer purchases a new merchandiser because the old merchandiser could not be economically reconfigured. Moreover, the glass initially selected by the customer is prefabricated and permanently fixed in a mounting sub-assembly. If the customer wishes to change the requested profile during manufacture, this sub-assembly could be removed, but would have to be stored until the arrival of another order for that profile.

Known merchandiser designs provide that each unique well configuration (e.g.,CMT-5, left-hand) have its own well. Consequently, there are on average three (3) different wells for each merchandiser size, depending upon its configuration (e.g., self-serve on the left or right, full-serve unit only, and self-serve unit only). This further limits flexibility in merchandiser design and make desirable options, practically unavailable. For instance, the self-serve portion of a combined self-serve/full-service merchandiser was about 635 mm (about 25 inches) wide. A combination merchandiser may not be reversed such that the 635 mm (about 25-inch) wide portion was full-serve and the other end well was self-serve.

Many heated merchandisers use low pressure/low velocity air movement around the displayed food product to achieve adequate holding performance. Higher air circulation rates may maintain the food at the required temperature for a longer period of time, but also may cause a higher rate of evaporation and may dry the product out more quickly. This low pressure/low velocity circulation of air may create a series of problems due to an associated stratification of the air inside the heated portion of the merchandiser. For example, the upper portion of the merchandiser food product cavity may tend to experience high exterior surface temperatures. The problem is currently addressed by the addition of a heat shield or barrier or the application of additional insulation in the affected areas. Electronic components, such as controls and sensors, may be more effective from an ergonomics standpoint if mounted in the upper portion of the food product cavity, but in that position, may be subjected to the high temperature environment. Traditional solutions to this problem have been to accept the ergonomic disadvantage of placing the controls in another location [or to use fans to exhaust the high temperature air in the control areas]. Finally, low volume air circulation may lead to "fogging" of the front glass under certain conditions.

Existing merchandisers with doors on the serving side are problematic for high volume operators during peak service periods. The problems with such merchandiser are due in large part to the need to frequently open and close the doors between serving customers in order to maintain air temperature and humidity within the food product cavity. If the merchandiser is operated as specified, the server may have a difficult time keeping up with demand. In some cases, doors are left in the open position or even removed, but the quality of the food product may diminish rapidly in this open environment. Simply increasing the power supplied to the heating elements may not solve the problem because the energy is not necessarily distributed evenly enough to create a consistent product environment throughout the food product cavity. Further, this attempted solution does not achieve efficient operation of the merchandiser and may create other problems within the merchandiser.

SUMMARY OF THE INVENTION

U.S. Provisional Application Ser. No. 60/131,467, filed Apr. 28, 1999, and U.S. Provisional Application Ser. No. 60/132,405, filed Apr. 30, 1999, are incorporated herein by reference.

The merchandisers of the present invention have been designed to provide operators with improved flexibility in the configuration of the merchandiser and superior operational performance. It is a technical advantage of this invention, that merchandisers may be supplied to customers from a single, base merchandiser configuration having 3, 4, 5, 6, or 7-well sections in either full or self-serve merchandisers, and 4, 5, 6, or 7-well sections in merchandisers combining full and self-serve sections or groups of sections. The merchandisers, according to this invention, preferably are dimensioned to correspond to the outside dimensions of known merchandisers, i.e., the 3, 5, or 7-well section merchandisers manufactured by Henny Penny Corporation of Eaton, Ohio, and Tyler Refrigeration Corporation of Niles, Mich. In the combination units, virtually any arrangement of full and self-serve wells may be created having two well section increments of either full or self-serve. For example, a 7-well section merchandiser may be fabricated with two self-serve well sections on the left, three full-serve well sections in the center, and two more self-serve well sections on the right.

It is a further technical advantage of this invention that RAYMAX® emitter strip heating elements, manufactured by Watlow Electric Manufacturing Company, of St. Louis, Mo., have been incorporated into the merchandisers. These heating elements are extremely efficient and are sized and shaped to focus heat over the entire food product.

It is still a further technical advantage of the invention, that the merchandisers may be initially configured or readily reconfigured to include anyone of at least four glass front profiles. Merchandisers may include a curved, extended curve, bowed or flat profile, the first three of which are currently available on merchandisers available from Henny Penny Corporation of Eaton, Ohio. Merchandisers, according to the present invention, may be readily reconfigured either during production in response to a customer order change or at the customer site.

It is another technical advantage of this invention, that the merchandiser is designed for operation with its rear door or doors removed. The directional heating capabilities provided by the use of the emitter strip heating element facilitate such open door operation by allowing food product temperatures to be maintained without significantly adjusting heating element output or changing air circulation patterns within the food product cavity. Further, the rear door or doors of the merchandisers may be mounted on a contoured lower rear door track. This contoured track avoids the deep guide tracks of known rear door merchandiser configurations. Consequently, removal of the rear door or doors is simplified because the rear door is not seated in a deep guide track. Further, cleaning is made more efficient and may be accomplished more thoroughly by the elimination of deep guide tracks which may collect dirt and food scraps.

It is still another technical advantage of this invention that the controls are mounted above the merchandise's rear door or doors, so that they may be readily accessed and monitored during serving operations. In addition, to the increased efficiency attainable by this placement of the merchandiser controls, the positioning of the controls which permit the operator to stand upright and monitor and adjust the controls while serving from the merchandiser, also may be ergonometrically beneficial.

It is yet another technical advantage of this invention that the merchandiser eliminates or reduces the need for sealing gaskets to limit heat escape from the food product cavity and eliminates or reduces the need for an additional, stainless steel heat shield at the peak of the food product cavity. Elimination or reduction in the size of these components may simplify cleaning of the merchandiser by eliminating or reducing difficult to clean portions, i.e., rubber gaskets, or reducing gap and other areas in which dirt may collect. In addition, elimination of or reduction in the size of these components allows improved visibility of the merchandiser contents.

In an embodiment, the invention is a merchandiser for displaying food products and holding such food products at a controlled temperature. The merchandiser comprises a well divided into a plurality of well sections, wherein each of the well sections receives a serving tray and wherein the serving trays collectively have a center line. A rear access door, a pair of side plates, and a transparent front plate, together with the well, define a food product holding cavity. A pair of supporting brackets position a merchandiser heating and control device above the well. The merchandiser heating and control device comprises a heating compartment, which positions at least one heating element and at least one illuminating element substantially above the center line of the serving trays, wherein the heating compartment includes at least one circulating fan for circulating heated air from the heating compartment into the food product cavity. The merchandiser heating and control device also comprises a retaining bracket for receiving an upper edge of the rear access door and has an enclosed guide surface. Further, the merchandiser heating and control device comprises a control compartment positioned above the retaining bracket and containing control elements for controlling the at least one heating element and the at least one illuminating element and having a rear control panel, wherein the control compartment includes at least one cooling fan for cooling the control elements and a plurality of vents formed in the control panel for drawing cooling air into the control compartment from outside the food product cavity and for exhausting heated air outside the food product cavity. Moreover, the merchandiser heating and control device comprises a securing bracket for mounting an upper edge of the transparent front plate.

In another embodiment of the invention, a merchandiser for displaying food products and holding such food products at a controlled temperature comprises a well comprising a bottom surface, a front wall, and a rear wall, wherein the front wall is formed in opposition to the rear wall. A rear access door, a pair of side plates, and a transparent front plate, together with the well, define a food product holding cavity. A pair of supporting brackets positions a merchandiser heating and control device above the well. The well includes a plurality of pairs of well divider connection points. One of each pair of connection points is opposingly located on the front wall and the rear wall, respectively. At least one well divider for dividing the well into at least two well sections is affixed to a pair of connection points. The well may further include at least one row (and preferably, a plurality of parallel rows) of bottom wall connection points. Each row of the bottom wall connection points is aligned to correspond to a pair of well divider connection points, such that a well divider may be affixed by fasteners (e.g., machine bolts or studs and acorn nuts) to the well side and bottom walls.

In still another embodiment, the invention defines a method of manufacturing a merchandiser. The manufactured merchandiser comprises a well divided into a plurality of well sections, wherein each of the well sections receives a serving tray and wherein the serving trays collectively have a center line. A rear access door, a pair of side plates, and a transparent front plate, together with the well, define a food product cavity. A pair of supporting brackets positions a merchandiser heating and control device above the well. The merchandiser heating and control device includes a pivotable securing bracket for mounting an upper edge of the transparent front plate. The method comprises the steps of selecting a cross-sectional shape of the transparent front plate, selecting a pair of side plates having an edge contour corresponding to the cross-sectional shape of the transparent front plate, and selecting a front transparent plate support piece corresponding to the cross-sectional shape of the transparent front plate. The method further comprises the steps of mounting the transparent front plate to the securing bracket; mounting one of the side plates to each of the supporting brackets, such that the edge contour of each of the side plates corresponds to the cross-sectional shape of the transparent front plate; and mounting the front transparent support piece to the merchandiser to receive and support a front edge of the front transparent plate.

Other objects, features, and advantages will be apparent to persons of ordinary skill in the art in view of the following detailed description of preferred embodiments and the accompanying drawings.

BRIEF DESCRIPTION OF THE DRAWINGS

For a more complete understanding of the present invention, the needs satisfied thereby, and the features and advantages thereof, reference now is made to the following descriptions taken in connection with the accompanying drawings in which:

FIGS. 11a–c depict a perspective view of a rear door, a plan view of the rear door, and an end view of the rear door, respectively.

DETAILED DESCRIPTION OF PREFERRED EMBODIMENTS

Figure 1:
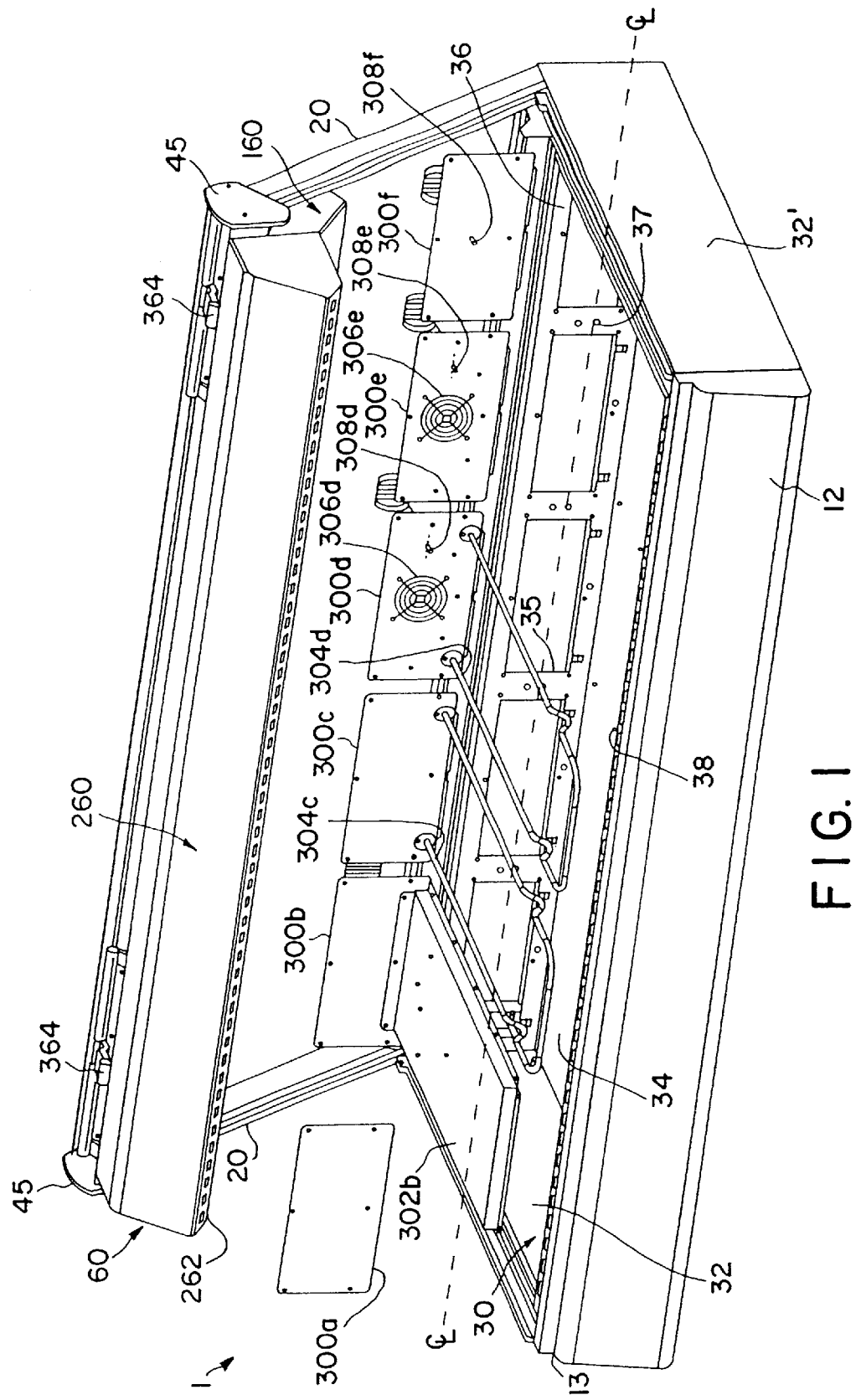
FIG. 1 depicts an exploded, front view of a five well section merchandiser configuration, in which each well may be individually equipped with one of at least six different functional cover plates.

Referring to FIG. 1, an exploded view of a merchandiser 1 is depicted. Merchandiser 1 may be mounted on a pedestal or base or on a cart. The height of such pedestals, bases, or carts may be chosen to fulfill the requirements of a particular restaurant, cafeteria, or the like, but the area upon which the merchandiser sits is determined by the number of well sections. Alternatively, merchandiser 1 may be supported by legs. Merchandiser 1 comprises a well 30, which is configured to be divided into two, three, four, or five well sections; a pair of supporting brackets 20; and a merchandiser heating and control device 60. The width and length of the well for the merchandiser according to this invention is determined by the number of well sections into which the well is to be divided. The depth of the well is determined by the trays utilized, e.g., about 178 mm (7 inches).

Well 30 comprises a nosepiece 12 having a front plate receiving lip 13, for receiving a front edge of a transparent front plate (not shown). Well 30 further comprises a pair of inner side walls 32 and a pair of outer side walls 32', a pair of inner longitudinal walls 36, and an inner well bottom surface 34. As noted above, well 30 is configured to be divided into up to five well sections. The rear, inner longitudinal wall 36 is depicted as having five plate openings 35 arrayed along the rear of well 30. In addition, each of longitudinal walls 36 is equipped with corresponding pairs of well divider, longitudinal wall connection points 37 and bottom wall 34 is equipped with four parallel rows of well divider bottom wall connection points 38. Each row of well divider, bottom wall connection points 38 is aligned with a pair of well divider, longitudinal wall connection points 37, such that at least one well divider 130, as depicted in FIGS. 10a–d, may be joined by fasteners (e.g., machine bolts or studs and acorn nuts) to bottom wall 34 at well divider, bottom wall connection points 38 via divider bottom connection points 138 and to longitudinal walls 36 at well divider, longitudinal wall connection points 37. Although bottom lateral wall 136 is depicted as extending to the opposite side of well divider 130 from separator guide 132, bottom lateral wall 136 may be formed with the opposite orientation. Thus, well 30 may be divided into up to five well sections. Referring to FIGS. 10 a–c, a separator guide 132 of divider 130 is intended to receive separators (not shown) which may be used to further divide the food product cavity of merchandiser merchandiser 1 and a heater compartment 260, which is located at the center front of merchandiser 1. Heater compartment 260 is equipped with exhaust vents 261 for circulating heated air from heater compartment 260 to the interior of merchandiser 1. Device 60 is secured to supporting brackets 20 by securing bracket covers 45. At the top of device 60 and between securing bracket covers 45, a pair of pivoting members 364 form part of the assembly for securing a transparent front plate (not shown) to merchandiser 1.

Figure 2:
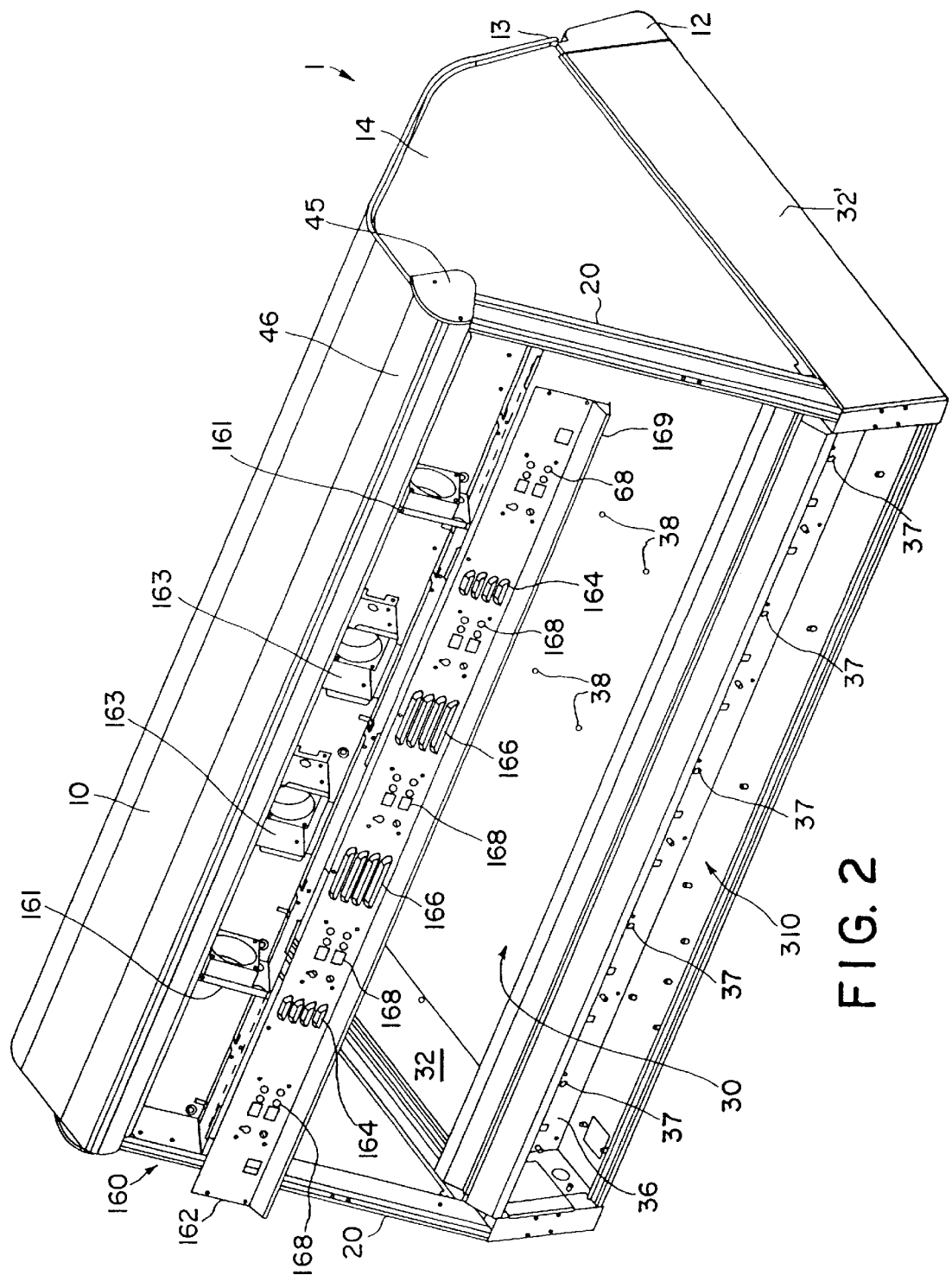
FIG. 2 depicts an exploded, rear view of a merchandiser with a single, undivided well, in which the control panel has been removed to reveal the control compartment cooling fan mounts.

Referring to FIG. 2, an exploded, rear view of merchandiser 1 is depicted. As with the depiction in FIG. 1, a single, undivided well 30 is shown, for which a rear access cover (not shown) has been removed to reveal a cover plate connector compartment 310 for housing the connections between various cover plates 300a–f and the reverse side of rear, inner longitudinal wall 36. In some embodiments of the merchandiser of this invention, a fold down cutting board (not shown) would obscure this portion of the merchandiser.

This depiction of merchandiser 1 includes two significant additions to merchandiser 1 of FIG. 1. First, a transparent front plate 10 has been mounted to device 60 and the mounting assembly has been covered with a mounting assembly cover 46. Transparent front plate 10 may be a contoured sheet of plate glass having a thickness greater than about 6.35 mm (about ¼ in.). Second, a pair of side plates 14 have been mounted on support brackets 20 and outer side walls 32'. The front and top edges of side plates 14 have contours corresponding to the cross-sectional contour of transparent front plate 10. Side plates 14 may also be flat, but shaped, sheets of plate glass having a thickness greater than about 6.35 mm (about ¼ in.). Transparent front plate 10 and side plates 14, therefore, may allow additional natural lighting of the food products contained within merchandiser 1. Together, well 30, side plates 14, and transparent front plate 10, define a food product cavity 70.

In addition, merchandiser 1 of FIG. 2 depicts a control compartment 160 with a control panel 162 removed. Panel 162 includes air intake vents 144, which permit cooling air to be drawn into control compartment 160, exhaust vents 166, which permit heated air to be vented from control compartment 160, and control button apertures 168, which allow access to control buttons touch pads, switches, or a combination thereof of a control unit (not shown). The merchandiser controls include flow logic and controller program for closed-door and open door operation of merchandiser having centrally positioned, emitter strip heater units and heated air circulation fans.

In particular, the control unit may permit the radiant heat from the emitter strips and convection heating from below the serving trays to be controlled separately. Further, the control unit may include separate switches for heater power and lighting, and the control units may provide separate controls, for the circulating and cooling fans. Finally, the control unit may provide for certain alarms as warnings for undesirable conditions, such as low water level in the humidity generating pan. For example, separate control panels for each well may be located above the rear doors or a single control panel located on the left, on the right, or in the center of the panel above the rear access doors.

Control panel 160 is equipped with a wedge-shaped protrusion located along its lower edge. This wedge-shaped protrusion is a heated air deflector 169, which deflects heated air escaping from the food products cavity from flowing across the face of control panel 162. The air deflector modifies the flow of air exiting the rear of the merchandiser in such way that it does flow across the face of the control panels and does not get pulled into the cooling air inlets. This is very desirable when the doors are opened during serving or when the doors are removed for high volume periods. A deflector has been fashioned in such a way that the flow of air due to natural convection is altered to avoid overheating of the control panel. The deflector does this in two ways. First, the deflector extends rearward from the control panel and cooling inlet surfaces. After the air moves away from the merchandiser rearward, the shape of the deflector creates turbulent air flow on the upward side of the deflector. This turbulent air flow causes the heated air to mix with cooler ambient air prevents the heated column of air from "adhering" to the control panel and cooling air inlet surfaces. As a result, the control panel and cooling air inlets are exposed to a boundary region of relatively cool air.

The deflection of this escaping heated air is important for at least two reasons. First, if heated air were permitted to flow across control panel 162, it might be drawn into air intake vents 164 and adversely effect the cooling of control compartment 160. Second, if heated air is permitted to flow across control panel 160, the buttons, switches, touch pads, or the like, of the control unit or the metal surface of control panel 162 may become hot to the touch and it may be uncomfortable for an operator to use the control panel.

Control compartment 160 is equipped with a plurality of mountings for affixing circulation fans. Specifically, in FIG. 2, control compartment 160 includes a pair of control compartment cross-ventilation fan mounts 161, which are substantially aligned with intake vents 164, and a pair of control compartment exhaust fan mounts 163, which are substantially aligned with air exhaust vents 166.

The control units may control a variety of apparatus within merchandiser 1. For example, the control units may control the temperature or humidity, or both, within an individual well section. They also may control the cooling fans within control compartment 160 and the circulating fans and illumination apparatus in heating compartment 260. Moreover, sensors may be placed in the food product trays placed in the well sections. These sensors may be used to monitor the temperature of the food products and adjust the operation of the heating elements, the humidity generators, the circulating fans, or combinations thereof, to control the food product temperature. In addition, the control unit may include oral or visual earning signals concerning undesirable conditions, such as excessive heat, prolonged exposure to high heat, excessive humidity, prolonged exposure to high humidity, or apparatus (e.g., heating element or fan) failure. The control unit may be operated in an automatic mode, a manual mode, or a combination thereof.

Figure 3:
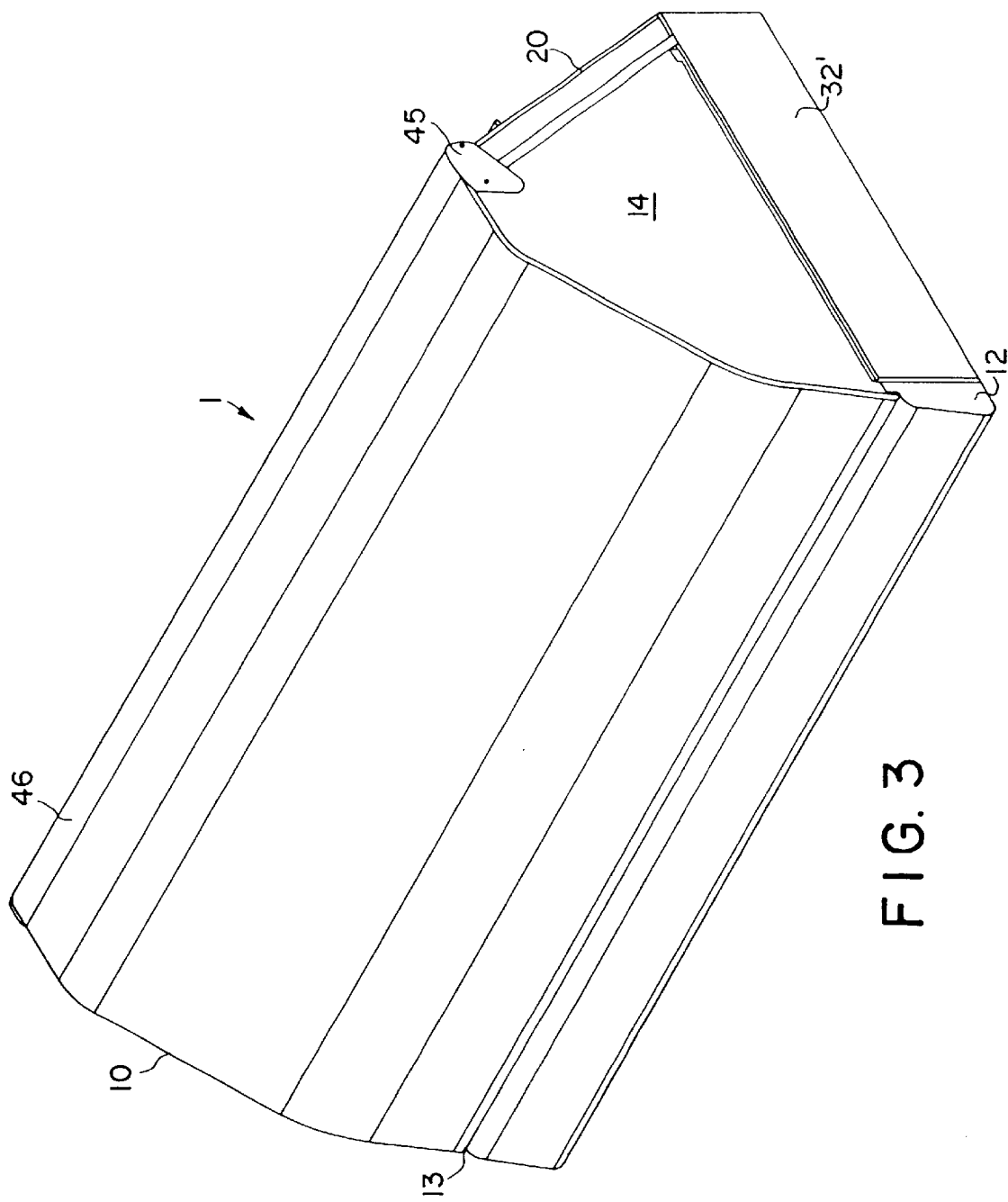
FIG. 3 is a perspective view of a merchandiser with a curved front glass profile.
Figure 4:
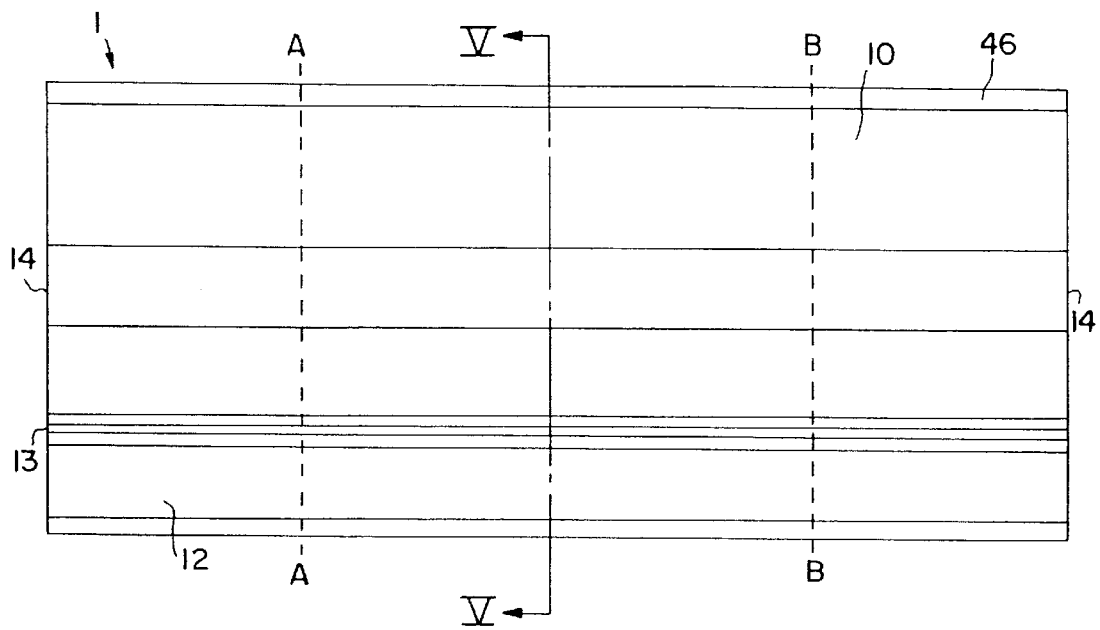
FIG. 4 is a front view of the merchandiser of FIG. 3.

Referring to FIGS. 3 and 4, a perspective view of merchandiser 1 with curved transparent front plate 10 and a front view of merchandiser 1 of FIG. 4 are depicted, respectively. In particular, FIG. 3 shows nosepiece 12 affixed to the front of merchandiser 1, and transparent front plate 10 is received in front plate receiving lip 13 of nosepiece 12. Support brackets 20 extend from outer side wall 32' to the top of merchandiser 1 and are joined to mounting assembly cover 45 by securing bracket cover 45. Further, side plate 14 again are shown mounted on outer side wall 32' and support bracket 20, and the forward and upper edges of side plate 14 are in close conformity with the cross-sectional shape of transparent front plate 10.

Referring to FIG. 4, transparent front plate 10 may extend fully between side plates 14, or it may be divided into segments by lines A—A and B—B, such that a section of transparent front plate 10 is removed to correspond to well sections designated to include self-serve, food products. For example, the segment of transparent front plate 10 to the left of line A—A may be removed to permit a well sections or sections in that area to be used for self-serve food product selections.

Figure 5:
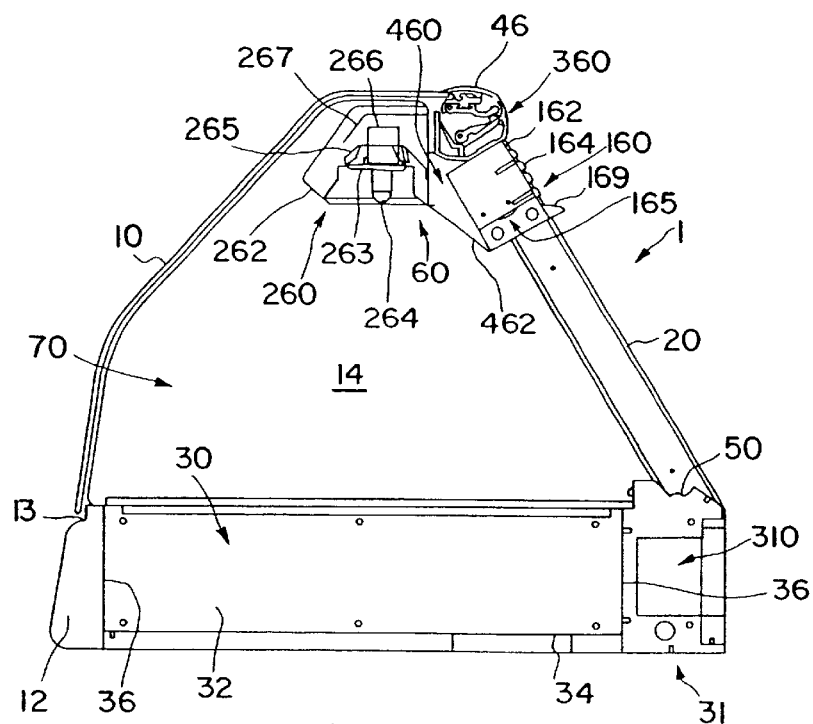
FIG. 5 is a cross-sectional view of the merchandiser of FIGS. 3 and 4, along line V—V.

Referring to FIG. 5, a cross-sectional view of merchandiser 1, as depicted in FIGS. 3 and 4, is shown. The cross-sectional view is imaged along line V—V of FIG. 4. Again, well 30 comprises a pair of inner longitudinal walls 36; a pair of inner side walls 32, one of which is shown in FIG. 5; and an inner bottom wall 34. Nosepiece 12 is affixed directly to the exterior surface of front, inner, longitudinal wall 36. At the rear of merchandiser 1, a housing 31 is affixed to the exterior surface of rear, inner, longitudinal wall 36 and forms cover plate connector compartment 310.

Each of support brackets 20 are secured to outer side walls 32' and a contoured lower rear door track 50 extends between the lower ends of support brackets 20 along the upper edge of housing 31. At the upper ends of support brackets 20, merchandiser heating and control device 60 also spans the length of merchandiser 1 between the support brackets 20. Device 60 comprises at least four components: control compartment 160, heating compartment 260, a front plate securing and pivoting assembly 360, and an insulating gap 460.

Air is gently circulated via fans to move heated air around the food product. This heating system is augmented by a second set of fans that moves heated air from the upper portion of the food product cavity to the well sections. Heated air circulation fans remove heated air from the upper portions of the merchandiser, including the area above the heaters and the lights and the vicinity of the control units, and circulate this heated air throughout the merchandiser. This "dry" heated air from the upper portions of the merchandiser may mix with humid, heated air generated in the merchandiser well sections. The advantages of such a system are lower surface temperatures in the upper region of the food product cavity, lower control temperatures, improved food holding performance, and higher efficiency. The invention addresses each of these issues in a fundamentally different way from conventional merchandisers. High temperature air in the upper portion of the heating and control device is recycled into the food product cavity, rather than left alone or exhausted to the merchandiser exterior. A series of fans in the upper portion of the food product cavity is strategically arranged to draw in relatively cool exterior ambient air, circulate this air across critical areas like the control panel and the heating and control device with which customers or employees are most likely to come into contract. This, now "heated," air is exhausted into the food product cavity in such a way that condensation on the transparent front plate is reduced or eliminated, and the air aids in keeping the product warm, but is not at such a high velocity flow, so as to dry the product out.

As discussed above, control compartment 160 faces rearward and is covered by control panel 162 which is equipped with air intake vents 164. Heated air deflector 169 is positioned at the lower edge of control panel 162.

An upper edge 83 of a rear door or doors 80, as depicted in FIGS. 11*a–c*, is inserted into a upper door guide 165 and the lower edge 85 of the rear door or doors 80 rests in contoured lower rear door track 50. Door(s) 80 may also be equipped with a handle 81 to open door(s) 80 during closed door operation. Contoured lower rear door track 50 permits quick removal and replacement of merchandiser rear access doors. This improved lower bracket designs also does not collect dirt as readily as the existing bracket design and is easier to clean than the existing bracket design. The configuration of contoured lower rear door track 50 is discussed in greater detail below, with respect to FIG. 7. When the rear door or doors is (are) removed, as depicted in FIG. 5, heated air tends to spill from the food product cavity at the lower edge of control compartment 160. Heated air deflector 169 directs the flow of this heated air away from the surface of control panel 162. Control panel 162 is angled away from vertical, as shown in FIG. 5, to further reduce the flow of heated air across control panel 162 when the rear door or doors is (are) open.

As discussed above, heating compartment 260 is centrally positioned at the top of the food product cavity of merchandiser 1. Heating compartment 260 includes a plurality of centrally positioned heating elements 263 and a plurality of centrally positioned illuminating elements 264. Heating elements 263 are preferably emitter strip heaters, such as RAYMAX® cemitter strip heater elements, which are produced by Watlow Electrtic Manufacturing Company of St. Louis, Mo. Preferably, these heater elements are curved with a substantially rectangular shape. The exterior dimensions of the heater elements are about 76 mm by about 195 mm (about 3 in. by about 7.6875 in), and the dimensions of the actual heating surface are about 76 mm by about 152 mm (about 3 in. by about 6 in.). The heater elements have an operating power of about 510 W at operating voltages of about 208 V or about 240 V. The internal resistance wire of the heater element generates a Watt density in a range of about 0.040 W/mm$^2$ to about 0.046 W/mm$^2$ (about 26 to 30 W/in.$^2$). Heating elements 263 may be shaped to project radiant heat over a specified area of well 30 and, thereby, hold the food products at a more precise and stable temperature. Moreover, heating elements 263 may be positioned, such that particular heating elements 263 may be activated depending upon what well section configuration is chosen for a merchandiser 1. Illuminating elements 264 may be halogen lamps and may also be positioned, such that particular illuminating elements 264 may be activated depending upon what well section configuration is chosen. For example, the wattage of the bulbs used will depend, in part, on their number and the number of well sections in the merchandiser, e.g., for a five well section merchandiser, six (6) 150 W bulbs would be used. The number of bulbs used equals the number of well sections plus one.

Heating elements 263 and illuminating elements 264 are secured in heating compartment 260 by means of heater supporting bracket 265 and illuminating element supporting bracket 266, respectively. Further, a radiant heat reflector 267 is positioned above both heating elements 263 and illuminating elements 264 to reflect radiant heat back into the food products cavity. Both heating elements 263 and illuminating elements 264 may be controlled by a control unit (not shown) in control compartment 160. Central location and in-line configuration of heaters and lights saves space within the merchandiser interior and, thus, permits the addition of the control compartment discussed above. This configuration also saves energy by providing more even and less wasteful distribution of light and heat over the merchandiser well sections.

Heating compartment 260 and control compartment 160 are separated by insulating gap 460. Insulating gap 460 is designed to separate control compartment 160 from heating compartment 260 and, thereby, help control temperatures experienced by the electronic components in control compartment 160. Insulating gap 460 includes an angled surface 462 which may help direct rising heat away from control compartment 160 and toward heating compartment 260.

Front plate securing and pivoting assembly 360 is located at the uppermost portion of device 60 and the upper most portion of merchandiser 1. The uppermost edge of transparent front plate 10 is secured by a front plate securing bracket 362 in front plate securing and pivoting assembly 360. For example, securing bracket 362 may be a hinge, such as those manufactured by Vieler International KG, of Iserlohn, Germany. The connection between transparent front plate 10 and securing bracket 362 is shielded from dirt and dust by mounting assembly cover 46.

Figure 6:
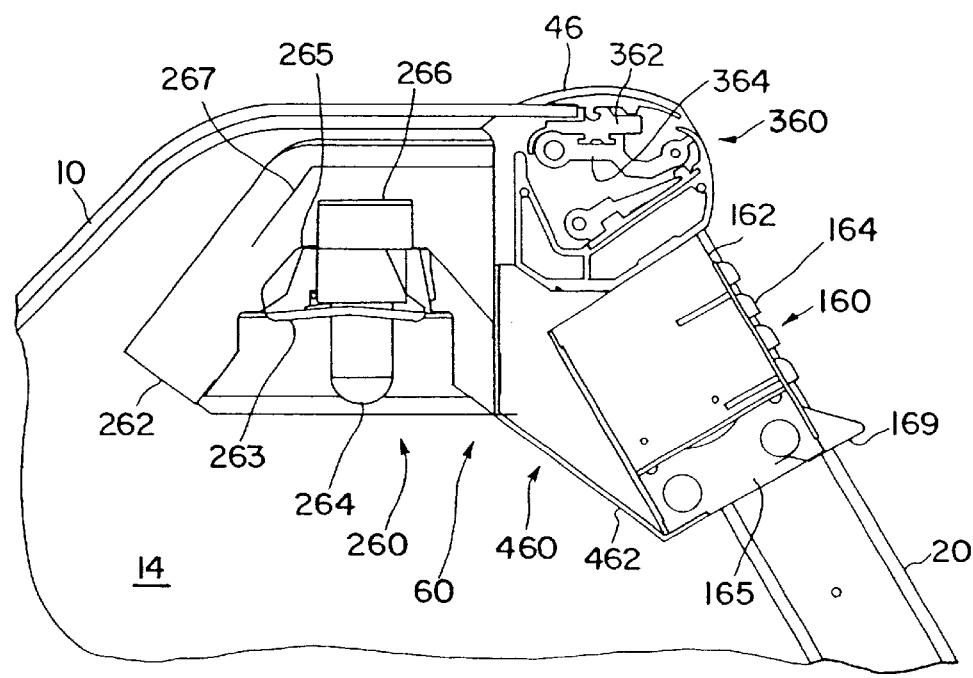
FIG. 6 is an enlarged, partial view of the upper portion of the cross-sectional view of FIG. 5, depicting a heating compartment, a control compartment, a front plate pivoting and securing assembly, and an insulating gap.

FIG. 6 depicts an enlarged, partial view of the upper portion of the cross-sectional view of FIG. 5. This figure shows the elements described above the respect to heating compartment 260, control compartment 160, front plate securing and pivoting assembly 360, and insulating gap 460 in greater detail. In particular, assembly 360 is shown to comprise securing bracket 362, which is pivotable on a securing bracket pivoting arm 364. The pivotable range of transparent front plate 10 is small, but is sufficient to permit transparent front plate 10 to be lifted to be more readily removable from securing bracket 362 during replacement of transparent front plate 10. This hinge also permits the transparent front plate to be pivoted upward for cleaning.

Retailers consider the overall appearance of a merchandiser one of the most important aspects of this type of apparatus. The flexibility to offer the merchandiser according to this invention in a variety of profiles and a variety of control positions provides for a number of alternative configurations for customers to choose from. Additionally, redesigning the heaters, lighting, and controls has reduced the mass and volume of the heating and control device considerably, allowing a more "open" view of the food and making the merchandiser itself less conspicuous. Conventional radiant heaters have been replaced with more compact emitter-type radiant heaters, and the lighting system was modified to accept fewer and smaller halogen lamps, rather than the larger, more numerous incandescent lamps. Each of these appearance enhancements has been made without sacrificing performance in either lighting or holding capability.

Modular construction of merchandiser allows a single merchandiser frame formed with a single, basic well having uniform well depth, e.g., about 178 mm (about seven (7) inches), to be configured during assembly or reconfigured at the customer's site for various well configurations and for various serve and self-serve configurations. For example, a merchandiser frame capable of including five (5) well sections is equipped with at least five (5), plate openings 35, each of which is wired, so that it may receive a replacement cover plate including a fan and heating coil connection points. Removable well dividers may be inserted into the merchandiser's basic well to create up to five (5) separate well sections. The bottom of the basic well is fitted with threaded attachment points which are received by openings in each separator wall. The walls are equipped with brackets which engage a pair of aligned openings arrayed along the upper edge of the basic well, and the wall may then be secured to the bottom of the basic well by acorn nuts. In order to comply with sanitation regulations, it may be necessary to seal any gaps between the basic well and the well divider. Further, by adding a glass divider to the well divider and altering the size of the transparent front plate, the merchandiser may be divided into serve and self-serve portions.

Figure 7:
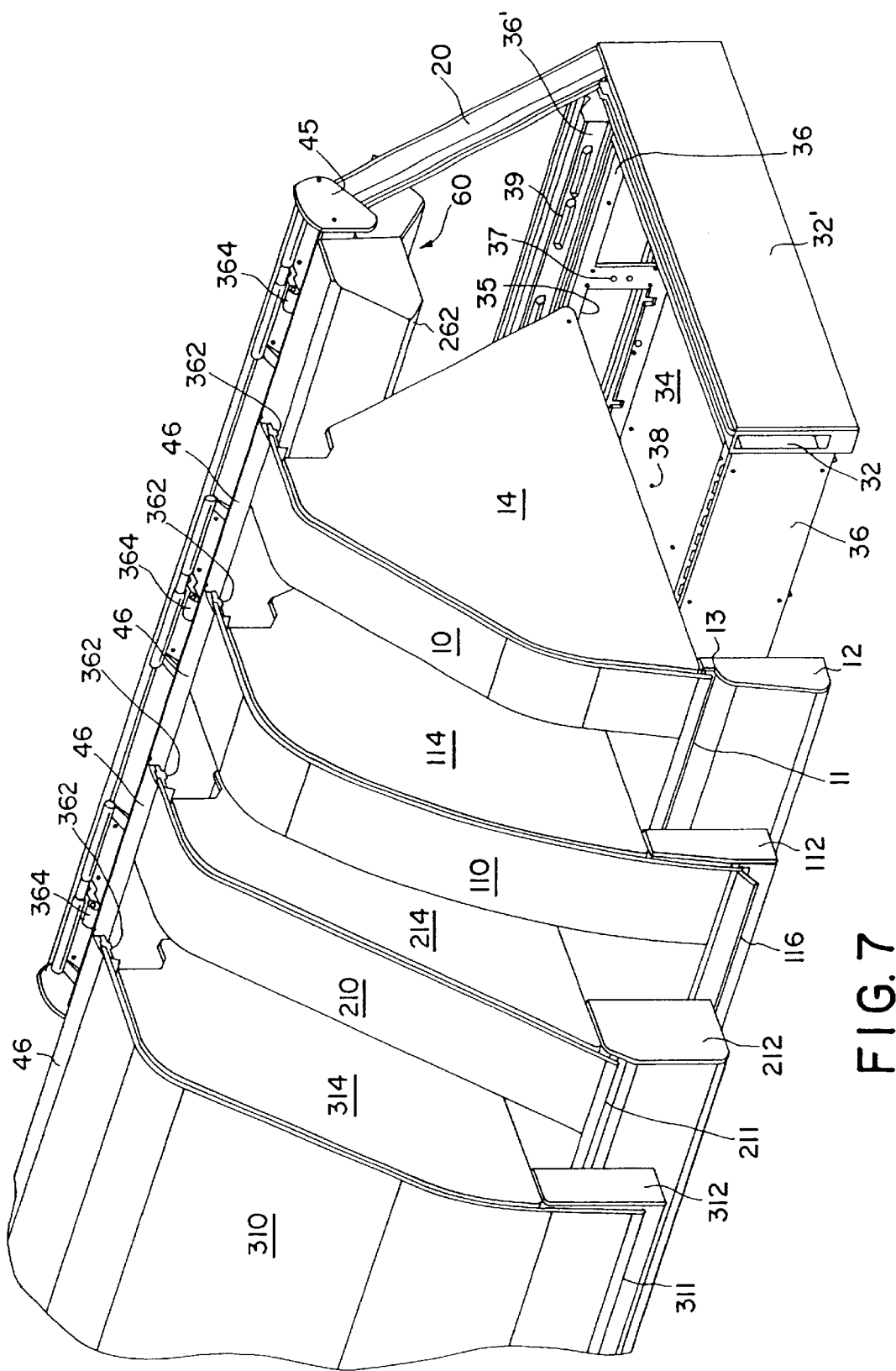
FIG. 7 depicts an exploded, perspective view of the merchandiser demonstrating the curved, flat, extended curve, and bowed glass profile configurations and the corresponding nosepieces.
Figure 8A:
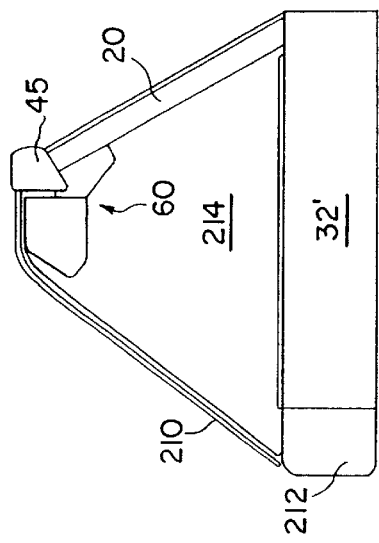
FIGS. 8a–d depict cross-sectional views of the curved, flat, extended curve, and bowed glass profile and the corresponding nosepieces.
Figure 8B:
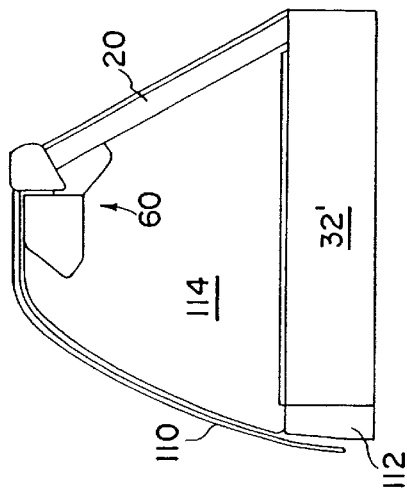
Figure 8C:
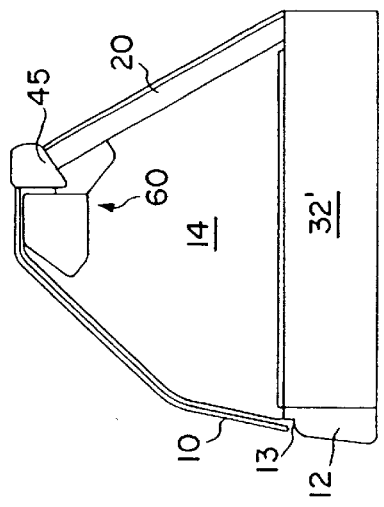
Figure 8D:
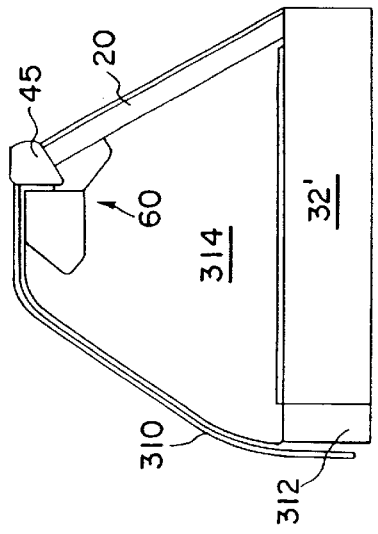
Figure 10A:
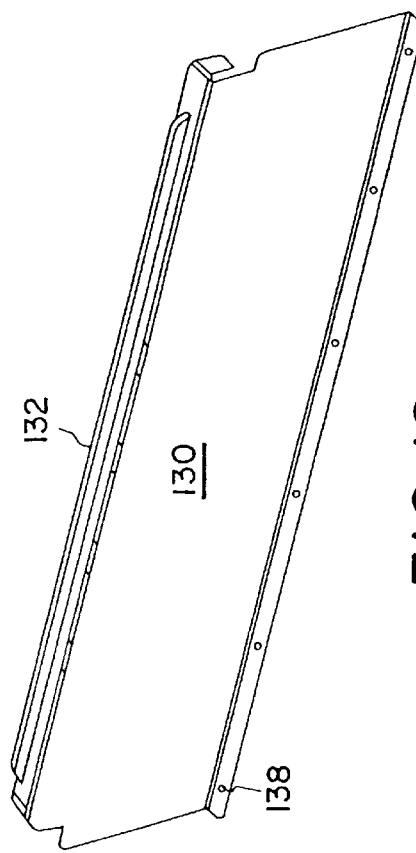
FIGS. 10a–d depict a perspective view of the a well divider, an overhead view of the well divider, an end view of the well divider, and a plan view of the well divider, respectively.
Figure 10B:
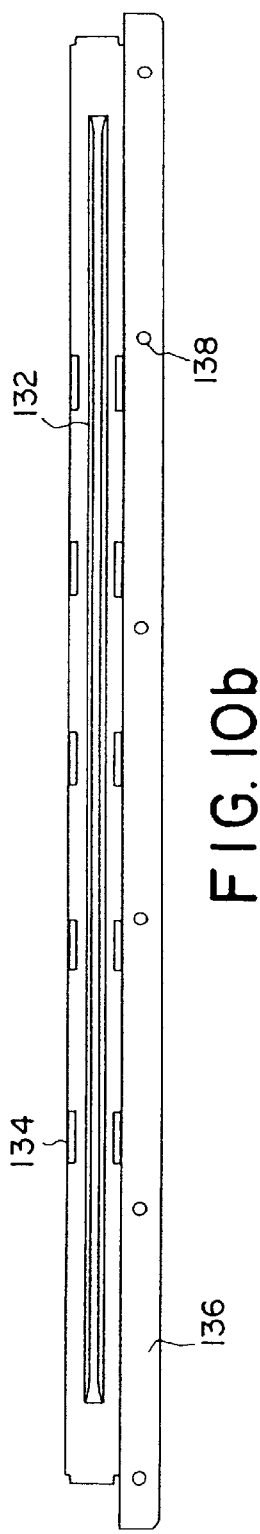
Figure 10C:
Figure 10D:
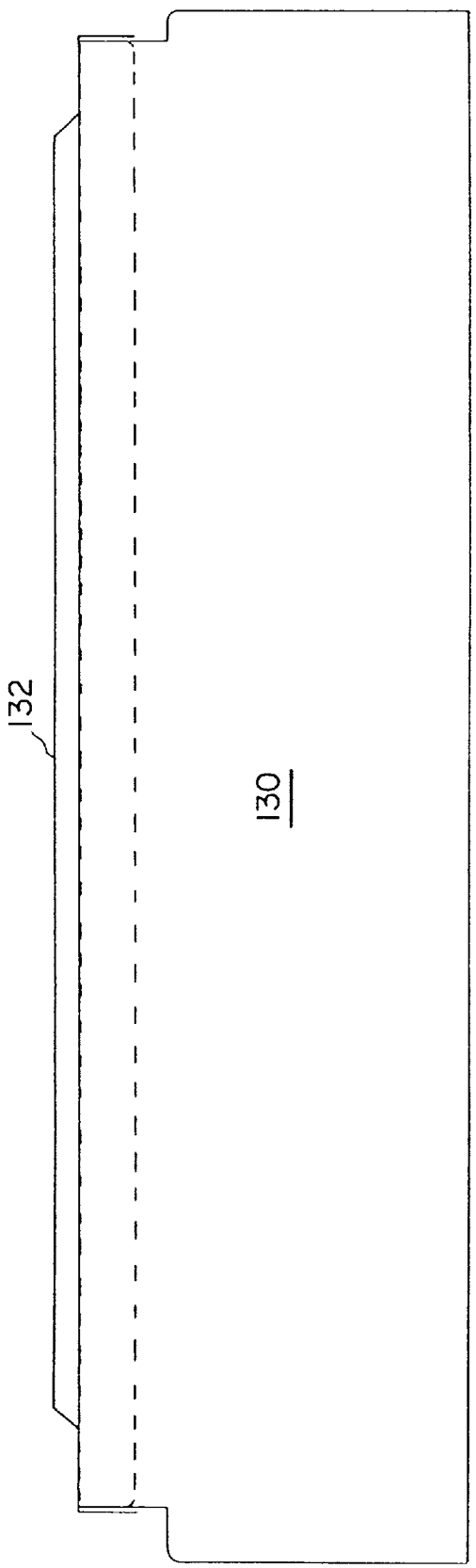

Referring to FIG. 7, a significant advantage of the invention of merchandiser 1 may be seen. The design of this invention allows for the front support (i.e., the decorative nosepiece) to be added as a last step. The merchandiser assembly process allows merchandiser assembly by using a single merchandiser frame having a single transparent front plate hinge positioned at the rear of the merchandiser and by varying four components of the merchandiser: the transparent front plate, two side plate, and a nosepiece. For example, separate control panels for each well may be located above the rear access doors or a single control panel located on the left, on the right, or in the center of the panel above the rear access doors. This means that the merchandiser may be built complete up to, but not including the front support, transparent front plate, and side plates. The actual profile of the unit may remain unknown until just before shipment. Then, the side plates (which cover the ends and are profile-dependent) may simply be slid into place. In addition, to make aesthetic assembly), a new front support and new side plates. This change would require a minimum amount of labor. Currently, a food retailer seeking to redesign a retail food store to provide an update or simply altered appearance must replace its merchandisers or return them to the factory for extensive overhaul to change their appearance with the merchandisers of the present invention, the appearance of the merchandiser may be changed by the replacement of four parts.

The merchandiser of the present invention is currently available in any of four profiles of transparent front plate 10. As indicated in FIG. 7, merchandiser 1 may be assembled by first selecting a transparent front plate, two side plates with front and top contours that correspond to the cross-sectional shape of the transparent front plate, and a nosepiece (or front transparent plate support piece). The slide plates are first installed; then the transparent front plate is mounted on securing bracket 362 and pivoted away from the merchandiser's frame on pivoting arm 364. The nosepiece is then affixed to the outer surface of the front, inner, longitudinal well wall 36, and the transparent front plate is lowered onto the nosepiece.

Referring again to FIG. 7, merchandiser 1 may be configured according to the following glass profile components:

TABLE 1

| Profile | Transparent Front Plate | Nosepiece | Side Plates |
| --- | --- | --- | --- |
| Curved | 10 | 12 | 14 |
| Bowed | 110 | 112 | 114 |
| Flat | 210 | 212 | 214 |
| Extended Curve | 310 | 312 | 314 |

Transparent front plate 110 further includes a lifting handle 116. The other transparent front plates 10, 210, and 310 instead include a reinforced edge 11, 211, and 311, respectively.

The merchandiser according to this invention allows for a wide variety of possible combinations of full and self-serve units offered in a particular size to be manufactured using one common well per size. This is done by making the variable parts of the well, e.g., heater and dividers movable to any possible position they may need to be. In this way only one well for each size merchandiser is needed with the variable parts handled as "mix-and-match" depending upon what unit is being built. The new design allows for extreme flexibility in manufacturing. The rear wall of every well compartment is covered by a cover plate that is fastened onto the well by screws. This plate, of which there are five (5) different ones, can accept a heater, heater/blower combination, water pan, blower only or a blank. This allows one well of each size to replace the average of three (3) mentioned above. Further, to accommodate self-serve and full-serve units within the same well, stud locators e.g., a small mark stamped into the surface of the sheet metal indicating where a weld stud needs placed e.g., are placed along every length where a well divider panel may go. The studs will be shot onto the well on the assembly line, as needed.

Referring to FIGS. 8a–d, the profiles of each of these configurations are depicted. The height of each of the four profiles is about 796 mm (about 31⅜ inches). The width of the merchandisers with each configuration varies slightly based on the profile selected for the transparent front plate and the width of the corresponding nosepiece. The dimensions of the various profiles are as follows:

TABLE 2

| Profile | Width | Height |
| --- | --- | --- |
| Curved | 938 mm (37 in.) | 796 mm (31⅜ in.) |
| Bowed | 952 mm (37½ in.) | 796 mm (31⅜ in.) |
| Flat | 1011 mm (39¾ in.) | 796 mm (31⅜ in.) |
| Extended Curve | 959 mm (37¾ in.) | 796 mm (31⅜ in.) |

In order to reconfigure a merchandiser, the customer first selects the desired replacement profile and a replacement transparent front plate, two replacement side plates, and a replacement nosepiece are selected. The existing transparent front plate of the merchandiser is pivoted on pivoting bracket 364, and the existing side plates and nosepiece are removed. The existing transparent front plate and its securing bracket 362 are then removed from pivoting bracket 364. The replacement transparent front plate with attached securing bracket 362 is mounted on pivoting bracket 364, and the transparent front plate is pivoted up. The replacement side plates are then mounted to the outer side well walls 32' and support brackets 20 and the replacement nosepiece is mounted on the exterior surface of front, inner, longitudinal well wall 36. The replacement transparent front plate is then pivoted into contact with the replacement nosepiece.

During high volume serving times, the rear door or doors of a merchandiser may become an impediment to servers in their efforts to keep the serving trays in the well sections of the merchandiser stocked with food and to rapidly serve customers passing through a serving line. The merchandiser has been designed with centrally located radiant heating and lighting components, a series of fans that scavenge "nuisance" heat from the heating and control device region, and easily removable rear doors. These improvements allow the merchandiser to be operated without doors during heavy serving periods, thereby eliminating the need to open and close the doors each time food is retrieved for a customer. For high volume operations, the labor savings and cycle time reduction may be significant.

The removal of the door or doors, however, may itself be cumbersome, especially if the rear door or doors fit tightly into a pair of conventional sliding door guides. The previous door track was a cut-to length extrusion and very deep which resulted in difficulty cleaning. In addition, such conventional guides may trap food pieces dust, dirt, and other debris, especially in the lower guide. This may create sanitary concerns and may clog the lower guide.

Figure 9:
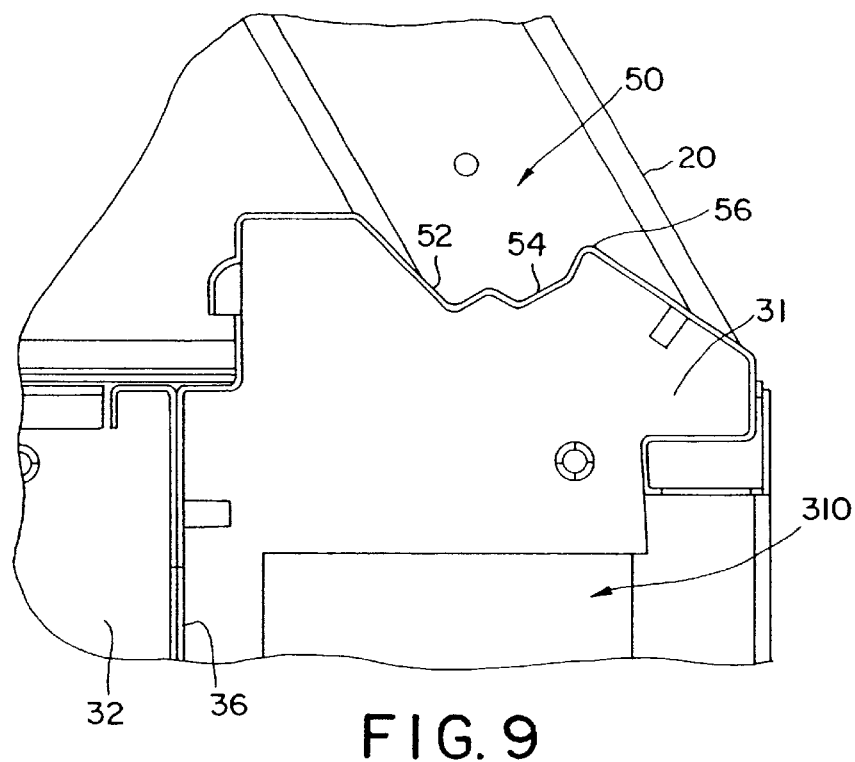
FIG. 9 is an enlarged, partial view of the lower rear portion of the cross-sectional view of FIG. 5, depicting the contoured lower rear door track.

The contoured lower door track may be formed by a one-hit tool. It is aesthetically pleasing and has no deep pockets like the conventional door track, which allows for easier cleaning. Referring to FIG. 9, contoured lower rear door track 50 permits a rear door or doors to be readily removed from track 50 and allows unobstructed access to the guides of track 50 for ready cleaning. As depicted in FIG. 9, a rear door or doors rests against a door supporting surface 52, and the lower portion of the rear door or doors is guided within a door bottom guide 54. Door bottom guide 54 is both shallower and wider than a conventional sliding door guide which simplifies cleaning of door bottom guide 54. Despite the shallow and wide guide, the rear door or doors are sufficiently retained within the guides by a low profile retaining lip 56, because of the relatively steep angle at which the doors are inclined. The rear door or doors are readily and quickly removed by simply lifting them into upper door guide 165 and traversing low profile retaining lip 56 with the bottom edge of the rear door or doors.

Figure 12:
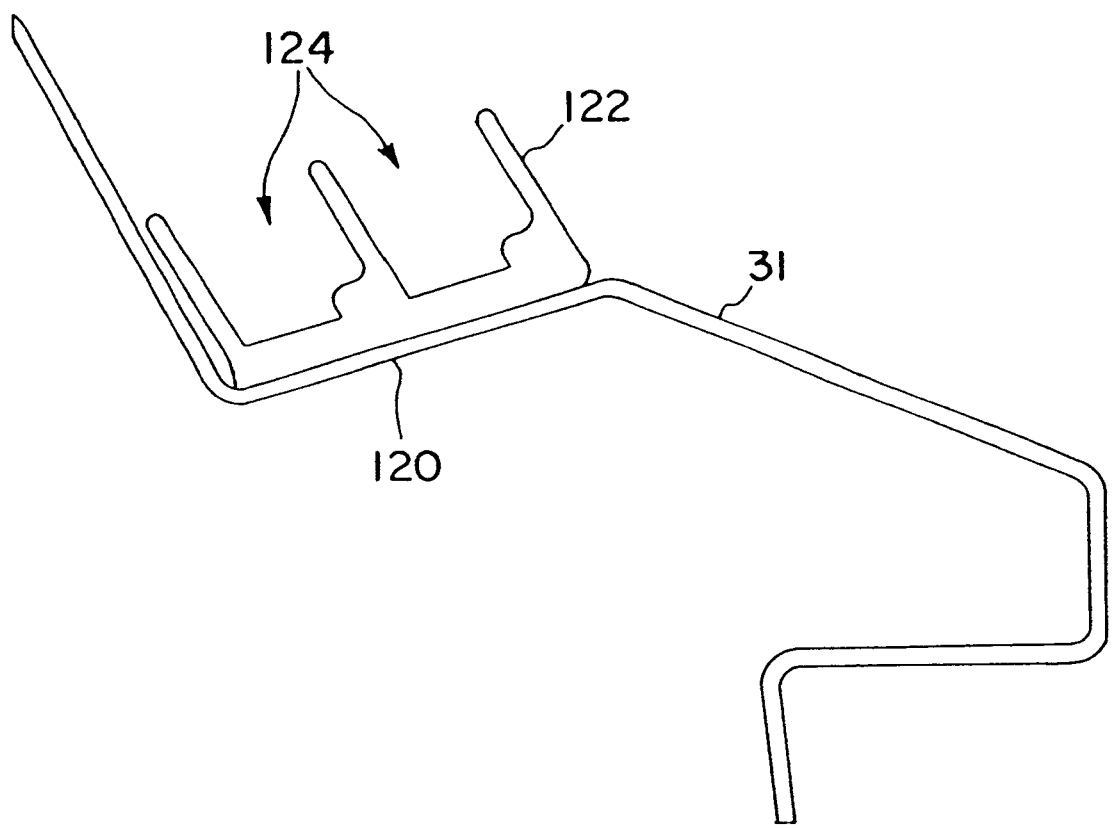
FIG. 12 depicts an enlarged, partial view of an alternative lower track guide for a rear door or doors.

Alternatively, referring to FIG. 12, housing 31 may include a lower door track platform 120 for receiving a lower track guide 122. Track guide 122 includes at least a pair of guides 124, each of which may receive lower edge 85 of rear door 80, depicted in FIG. 11a. This dual track configuration allows either of a plurality of rear doors 80 to be slid open. Track guide 122 may be affixed to platform 120 by welding or by fasteners (not shown), such as nuts and bolts or machine screws, or the like.

While the invention has been described in connection with preferred embodiments and examples, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification is considered as exemplary only, with the true scope and spirit of the invention being indicated by the following claims.

What is claimed is:

1. A method of manufacturing a merchandiser, wherein said merchandiser comprises a well divided into a plurality of well sections, wherein each of said well sections receives a serving tray and wherein said serving trays collectively have a center line; a rear access door, a pair of side plates, and a transparent front plate, which together with said well define a food product holding cavity; and a pair of supporting brackets, which positions a merchandiser heating and control device above said well; and wherein said merchandiser heating and control device includes a pivotable securing bracket for mounting an upper edge of said transparent front plate; comprising the steps of:

selecting a cross-sectional shape of said transparent front plate;

selecting a pair of side plates having an edge contour corresponding to said cross-sectional shape of said transparent front plate;

selecting a front transparent plate support piece corresponding to said cross-sectional shape of said transparent front plate;

mounting said transparent front plate to said securing bracket;

mounting one of said side plates to each of said supporting brackets, such that said edge contour of each of said side plates corresponds to said cross-sectional shape of said transparent front plate;

mounting said front transparent support piece to said merchandiser to receive and support a front edge of said front transparent plate.

2. The method of claim 1, wherein said well further comprises a bottom surface, a front wall, and a rear wall, wherein said front wall is formed in opposition to said rear wall includes a plurality of pairs of well divider connection points, one of each pair of connection points being oppositely mounted on said front wall and said rear wall, respectively, and wherein a plurality of plate openings are formed in said rear wall, such that each of said plate openings corresponds to one of said pairs of connection points; further comprising the steps of:

mounting at least one well separator for dividing said well into at least two well sections; and sealing each of said plurality of plate openings with a plate cover selected from the group consisting of a plate blank, a plate cover including a fan, a plate cover including a heating element, a plate cover including a fan and a heating element, a plate cover including a temperature sensor, and a plate cover including an extended heating surface.

3. A method of reconfiguring a merchandiser manufactured according to the steps of claim 1; comprising the steps of:

selecting a cross-sectional shape of a replacement transparent front plate;

selecting a pair of replacement side plates having an edge contour corresponding to said cross-sectional shape of said replacement transparent front plate;

selecting a replacement front transparent plate support piece corresponding to said cross-sectional shape of said replacement transparent front plate;

removing said front transparent support piece from said merchandiser;

removing said front transparent piece from said securing bracket and removing said side plates from said support brackets;

mounting said replacement transparent front plate to said securing bracket;

mounting one of said replacement side plates to each of said supporting brackets, such that said edge contour of each of said side plates corresponds to said cross-sectional shape of said replacement transparent front plate;

mounting a replacement front support piece to said merchandiser to receive and support a front edge of said replacement front transparent plate.

4. A method of reconfiguring a merchandiser manufactured according to the steps of claim 2; comprising the steps of:

removing said at least one well separator and each of said plate covers;

mounting at least one well separator for dividing said well into at least two well sections; and sealing each of said plurality of plate openings with a plate cover selected from the group consisting of a plate blank, a plate cover including a fan, a plate cover including a heating element, a plate cover including a fan and a heating element, a plate cover including a temperature sensor, and a plate cover including an extended heating surface.

* * * * *